United States Patent [19]

Maresca et al.

[11] 4,386,186

[45] May 31, 1983

[54] PROCESS FOR PREPARING POLYARYLATES

[75] Inventors: Louis M. Maresca, Belle Mead; Markus Matzner, Edison, both of N.J.

[73] Assignee: Union Carbide Corporation, Danbury, Conn.

[21] Appl. No.: 363,099

[22] Filed: Mar. 29, 1982

[51] Int. Cl.$^3$ ............................................. C08G 63/46
[52] U.S. Cl. ..................................... 525/68; 525/173; 525/174; 525/175; 525/176; 525/177; 525/437; 525/439; 525/440; 525/444; 525/445; 528/173; 528/179; 528/182
[58] Field of Search ................ 525/68, 173, 174, 175, 525/176, 177, 437, 439, 440, 444, 445, 448; 528/173, 179, 182

[56] References Cited

U.S. PATENT DOCUMENTS

| | | | |
|---|---|---|---|
| 4,281,099 | 7/1981 | Maresca | 528/179 |
| 4,294,956 | 10/1981 | Berger et al. | 528/179 |
| 4,294,957 | 10/1981 | Berger et al. | 528/179 |
| 4,296,232 | 10/1981 | Maresca et al. | 528/179 |
| 4,314,051 | 2/1982 | Berger et al. | 528/179 |

*Primary Examiner*—Maurice J. Welsh
*Attorney, Agent, or Firm*—Donald M. Papuga

[57] ABSTRACT

Described herein is an improved process for preparing a polyarylate having a reduced viscosity of from about 0.1 to greater than 1.0 dl/gm which process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises carrying out said process in the presence of at least one thermoplastic polymer. Also described herein are the products produced by said process.

48 Claims, No Drawings

PROCESS FOR PREPARING POLYARYLATES

BACKGROUND OF THE INVENTION

This invention is directed to an improved process for preparing polyarylates and the products produced by said process.

Polyarylates are polyesters derived from a dihydric phenol, particularly 2,2-bis(4-hydroxyphenyl)-propane also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is th diacetate process. In the diacetate process, a dihydric phenol is converted to its diester derivative, which is then reacted with an aromatic dicarboxylic acid(s), to form the polyarylate.

The polyarylate produced by such processes has been described as being blended with a wide variety of thermoplastic polymers to enhance one or more properties of the polyarylate. Generally, the polyarylate is blended with the thermoplastic polymer in powder or granular form in an extruder and extruded into strands, the strands chopped into pellets and the pellets molded into the desired article.

DESCRIPTION OF THE INVENTION

It has now been found that a thermoplastic polymer may be added to the diacetate process for preparing polyarylates. The resultant product has a good combination of mechanical properties.

The improved process for preparing a polyarylate having a reduced viscosity of from about 0.1 to greater than 1.0 dl/gm comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises carrying out said process in the presence of at least one thermoplastic polymer.

The acid anhydride suitable for use herein is derived from an acid containing from 2 to 8 carbon atoms. The preferred acid anhydride is acetic anhydride.

Any dihydric phenol well known to those skilled in the art may be used herein. Preferably, the dihydric phenol suitable for the use in this invention is of the following formula:

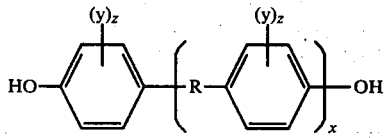

wherein y is independently selected from alkyl groups of 1 to 4 carbon atoms, chlorine or bromine, z independently has a value of from 0 to 4, inclusive, and R is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$, and CO, x is 0 or 1.

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

Generally, the dihydric phenol reacts with the acid anhydride under conventional esterifcation conditions to form the dihydric phenol diester. The reaction may take place in the presence or absence of a solvent. Additionally, the reaction may be conducted in the presence of a conventional esterification catalyst or in the absence thereof.

The aromatic dicarboxylic acid(s) that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 75:25. Also, from about 0.5 to about 20 percent of at least one aliphatic diacid containing from 2 to about 10 carbon atoms, such as adipic acid, sebacic acid, and the like, or mixtures thereof, may be additionally used in the polymerization reaction.

The preparation of the polyarylate may be carried out in bulk preferably in the presence of from about 10 to about 60, more preferably from about 25 to about 60, and most preferably, from about 30 to about 60 weight percent, based on the weight of the polyarylate produced, of an organic solvent.

The preferred organic solvents are a diphenyl ether compound as described in U.S. patent application Ser. No. 069,818, filed Aug. 27, 1979 and now U.S. Pat. No. 4,294,956 a cycloaliphatic substituted aromatic or heteroaromatic compound, as described in U.S. patent application Ser. No. 069,819, filed Aug. 27, 1979 and now U.S. Pat. No. 4,294,957 and a halogenated and/or etherated substituted aromatic or heteroaromatic compound, as described in U.S. patent application Ser. No.

126,994, filed Mar. 3, 1980, and now abandoned or mixtures of these.

The diphenyl ether compound, as described in U.S. patent application Ser. No. 069,818, may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol.

The cycloaliphatic compounds, or substituted aromatic or heteroaromatic compounds, as described in U.S. patent application Ser. No. 069,819, contain at least one benzylic and/or tertiary hydrogen atoms. These compounds have a boiling point of about 150° to about 350° C., preferably from about 180° to about 220° C., and a solubility parameter of ±4 within the solubility parameter of the polyarylate being produced. Solubility parameter is a measure for correlating polymer solvent interaction. It is defined in "Properties of Polymers", D. W. Van Krevelen, Elsevier Scientific Publishing Co., Amsterdam-Oxford-New York, 1976, pp. 141–155, as the square root of the cohesive energy density.

The cycloaliphatic compounds are of the following formulae:

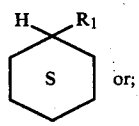

(I)

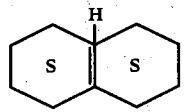

(II)

wherein $R_1$ is independently alkyl of 1 to 6 carbon atoms, cycloalkyl of 6 to 18 carbon atoms, and a is an integer of 1 or 2.

The substituted aromatic compounds are of the following formula:

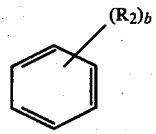

(III)

wherein $R_2$ is independently alkyl of 1 to 6 carbon atoms, cycloalkyl of 6 to 18 carbon atoms and aralkyl or alkaryl of 7 to 18 carbon atoms and wherein the carbon atom of $R_2$ attached directly to the benzene nucleus has 1 or 2 attached hydrogen atoms, and b is an integer of 1 to 6.

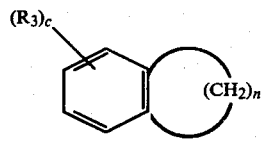

(IV)

wherein $R_3$ is independently alkyl of 1 to 6 carbon atoms, cycloalkyl of 6 to 18 carbon atoms, c is an integer of 1 or 2, and n is an integer of 1 to 6.

The heteroaromatic compounds are of the following formula:

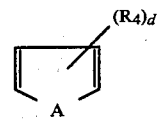

(V)

wherein A is S, O, or —CH=N—, $R_4$ is independently alkyl of 1 to 6 carbon atoms, or cycloalkyl of 6 to 18 carbon atoms and wherein the carbon atom of $R_4$ attached directly to the heteroaromatic nucleus has 1 or 2 attached hydrogen atoms, and is an integer of 1 to 4.

The preferred compounds encompassed by structures (I) through (V) include xylenes, cumene, diethylbenzene, diisopropyl benzene, tetrahydronaphthalene or decahydronaphthalene.

Additionally, the cycloaliphatic, substituted aromatic or heteroaromatic compounds may be used with up to 90 weight percent of other compounds such as diphenyl ether, dimethylsulfone, etc.

The halogenated and/or etherated substituted aromatic or heteroaromatic compounds, as described in U.S. patent application Ser. No. 126,994, are of formulae:

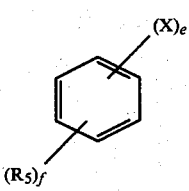

(VI)

wherein X is independently Cl, Br, F, or $OR_6$, e is an integer of 1 to 6, $R_5$ is independently alkyl of 1 to 16 carbon atoms, cycloalkyl of 6 to 18 carbon atoms, aryl of 6 to 18 carbon atoms, or aralkyl or alkaryl of 7 to 18 carbon atoms, $R_6$ is independently alkyl of 1 to 16 carbon atoms or cycloalkyl of 6 to 18 carbon atoms, and f is integer of 0 to (6-e).

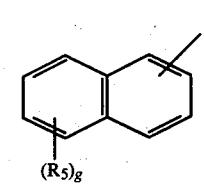

(VII)

wherein X, $R_5$m and a are as previously defined, e is an integer of 1 to 8 and g is an integer of 0 to (8-e).

The heteroaromatic compounds are of the following formula:

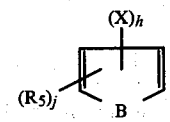

(VIII)

wherein B is O, S, or —CH=N—, X and $R_5$ are as previously defined, h is an integer of 1 to 4 and j is integer of 0 to (4-h).

The compounds encompassed by structures (VI) through (VIII) include 1,2,3-trichlorobenzene; 1,2,4-trichlorobenzene, 1.2- or 1,3- or 1,4-dichlorobenzene; 1,2,3- or 1,2,4- or 1,3,5-trimethoxybenzene; 1,2- or 1,3- or 1,4-dibromobenzene; chlorobenzene; bromobenzene; 1-chloronaphthalene; 2-chloronaphthalene; 1-bromonaphthalene; 2-bromonaphthalene; 1,2- or 1,3- or 1,4-dimethoxybenzene; 2-bromotoluene; 2-chlorotoluene; 4-bromotoluene; 4-chlorotoluene; anisole; 2-methylanisole; 3-methylanisole; 4-methylanisole; 2-chloroanisole; 3-chloroanisole; 4-chloroanisole; 2-bromoanisole; 3-bromoanisole and 4-bromoanisole.

Additionally, the halogenated and/or etherated substituted aromatic or heteroaromatic compounds may be used with up to 90 weight percent of other compounds such as diphenyl ether, dimethylsulfone, etc.

The amount of said solvents could vary during the polymerization reaction. For example, it may be advantageous to increase progressively the amount of these solvents to maintain the reaction medium at constant viscosity.

A catalyst may be used to accelerate the rate of polyarylate formation. All the conventional catalysts capable of accelerating an ester exchange reaction are suitable for use herein. These include metal salts, generally the Group VII and VIII metal salts, such as magnesium, manganese or zinc salts. The salts are generally organic acid salts and include acetates, propionates, benzoates, oxalates, acetylacetonates, or mixtures thereof. A preferred catalyst is magnesium acetate. The catalyst is present in the reaction in a catalytically effective amount which can be, for example, from about 1 to about 1000, preferably from about 10 to about 50, parts per million, based on the weight of the polyarylate produced.

The polyarylate polymer may be prepared in two reaction vessels by adding the acid anhydride and dihydric phenol to a reaction vessel and reacting these under esterification conditions described, supra to form the diester derivative of the dihydric phenol. Residual acid anhydride may then removed by methods known in the art, such as by vacuum distillation, or by chemical reaction with reactants which are not harmful to the polymerization, such as water, alcohols, dihydroxy compounds, and the like. The diester derivative may then be added to a second reaction zone, without any purification. The second reaction zone contains aromatic dicarboxylic acid(s), and optionally solvent and/or catalyst. The polymerization is then carried out. Alternatively, the diester derivative is added to the second reaction zone an aromatic dicarboxylic acid(s), and optionally, solvent and/or catalyst added thereto and the polymerization carried out. Any combination of adding the diester derivative, aromatic dicarboxylic acid(s), and optionally solvent and/or catalyst to a reaction vessel may be used.

In another embodiment of this invention, the diester derivative of the dihydric phenol is prepared in a reaction zone by reacting the acid anhydride and dihydric phenol therein under the esterification conditions described, supra. Residual acid anhydride may then removed by the procedures described, supra. Aromatic dicarboxylic acid(s) and optionally solvent and/or catalyst is then added to the reaction zone and the polymerization reaction carried out to produce the polyarylate.

The dihydric phenol diester is prepared by reacting a dihydric phenol with an acid anhydride at a temperature of from about 130° to about 160° C. for a period of from about 0.5 to about 4 hours and at a pressure of from about 1 to about 3 atmospheres. Generally, the reaction is carried out using an excess of acid anhydride. The acid anhydride is used at about 25 percent excess. The process is preferably carried out at a pressure sufficient to have the solvent refluxing at the reaction temperature. Under these conditions conversion to the dihydric phenol diester is at least 99.9 percent.

The polymerization process of this inention is carried out at a temperature of from about 260° to about 350° C. and preferably, from about 275° to about 295° C. The polymerization process is generally conducted in an inert atmosphere (such as argon or nitrogen) so that the oxygen content therein is minimized or eliminated. The oxygen content is generally less than about 100, preferably less than about 30, and most preferably less than about 10 parts per million. The process is preferably carried out at a pressure sufficient to have the solvent refluxing at the reaction temperature. This pressure is generally from about atmospheric to about 11 atmospheres. Lower and higher pressures may also be used.

The polymerization reaction is conducted for a period of time sufficient to produce a polyarylate having a reduced viscosity of at least about 0.1 to greater than 1.0 dl/gm, which time is generally less than about 10 hours. The reaction time is generally in the range of from about 4 hours to about 8 hours, depending on the particular polyarylate being prepared.

The polymerization reaction of this invention may be carried out batchwise or continuously and by using any apparatus desired.

The polyarylates are prepared as described, supra, in the presence of one or more thermoplastic polymers.

The thermoplastic polymers suitable for use in this invention include one or more of a polyester polymer, an aromatic polycarbonate, a styrene polymer, an alkyl acrylate polymer, a polyurethane, a vinyl chloride polymer, a poly(aryl ether), a copolyetherester block polymer, a polyhydroxyether, or combinations thereof, and the like.

A. Polyesters

The polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

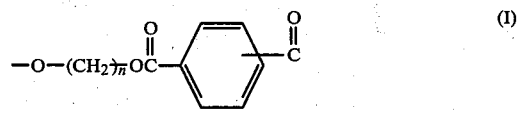
(I)

wherein n is an integer of from 2 to 4.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

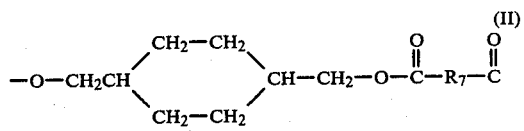
(II)

wherein the cyclohexane ring is selected from the cis- and trans- isomers thereof and $R_7$ represents an aryl radical containing 6 to 20 carbon atoms and which is the decarboxylated residue derived from an aromatic dicarboxylic acid.

Examples of aromatic dicarboxylic acids indicated by R in formula II, are isophthalic or terephthalic acid, 1,2-di(p-carboxyphenly)ethane, 4,4'-dicarboxydiphenyl ether, etc., and mixtures of these. All of these acids contain at least one aromatic nucleus. Fused raings can also be present, such as in 1,4- or 1,5-naphthalenedicarboxylic acids. The preferred dicarboxylic acids are terephthalic acid or a mixture of terephthalic and isophthalic acids.

A preferred polyester may be deirved from the reaction of either the cis- or trans-isomer (or a mixture thereof) of 1,4-cyclohexanedimethanol with a mixture of isophthalic- and terephthalic acids. These polyesters have repeating units of the formula:

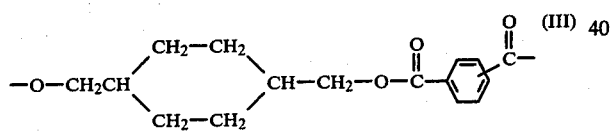
(III)

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

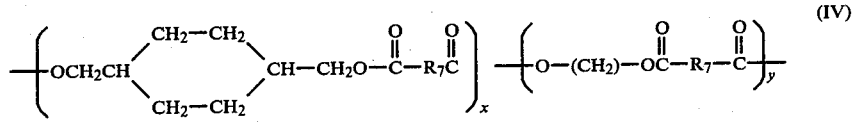
(IV)

wherein the cyclohexane ring is selected from the cis- and trans- isomers thereof, $R_7$ is as previously defined, n is an integer of 2 to 4, the x units comprise from about 10 to about 90 percent by weight and the y units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

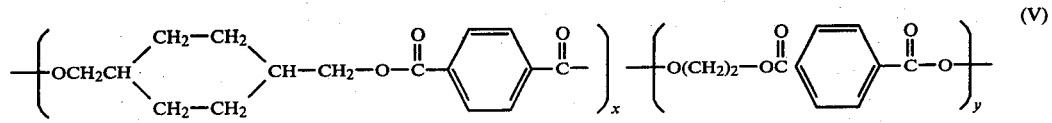
(V)

where $y=2x$ wherein x and y are as previously defined.

The polyester as described herein are either commercially available or can be produced by methods well known in the art, such as those set forth in, for example, U.S. Pat. No. 2,901,466.

The polyesters used herein have an intrisic viscosity of from about 0.4 to about 2.0 dl/g. as measured in a 60:40 phenol/tetrachloroethane mixture or similar solvent at 23°-30° C.

B. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measure in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl) heptane, 2-2-(3,5,3',5'tetrabromo-4,4'-dihydroxydiphenyl)propane, (3,3'dichloro-r,4'-dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters, or with a dibasic acid in the event a carbonate copolymer or inter-polymer rather than a homopolymer is desired for use in the preparation of the aromatic carbonate polymer.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(-chloronaphthyl)carbonate, etc. or mixtures thereof. The haloformates suitable for use herein include bishaloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptaor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripopylamine, N,N-dimethylaniline, quaternary ammonium compounds, such as tetraethylammonium bromide, cethyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyester carbonates may be used. These are described in, for example, U.S. Pat. No. 3,169,121. The preferred polyester carbonate results from the condensation of phosgene, terephthaloyl chloride, isophthaloyl chloride with bisphenol-A and a small amount of p-tertbutylphenol.

C. Styrene Resin

The styrene resins suitable fo use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generally described by the following formula:

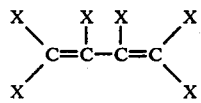

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

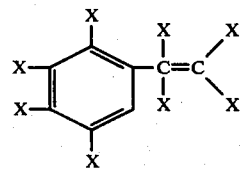

where X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, -bromostyrene, dichlorostyrene, dibromostyrene, tetrachlorostyrene, mixtures thereof, and the like. The preferred monovinylaromatic hydrocarbons used are sytrene and/or a -methylstyrene.

A second group of monomers that may be polymerized in he presence of the prepolymerized backbone are acrylic monomers such as acrylonitrile, substituted acrylonitrile and/or acrylic acid esters, examplified by acrylonitrile, and alkyl acrylates such as ethyl acrylate and methyl methacrylate.

The acrylonitrile, substituted acrylonitrile, or acrylic acid esters are described generically by the following formula:

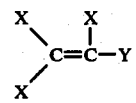

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where -methylstyrene (or other monomer) is substituted for the styrene in the composition used in preparing the graft polymer, a certain percentage of the composition may be an -methylstyreneacrylonitrile copolymer. Also, there are occasions where a copolymer, such as α-methylstyreneacrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

D. Poly(Alkyl Acrylate) Resin

The poly(alkyl acrylate) resin which may be used herein includes a homopolymer of methyl methacrylate (i.e. polymethyl methacrylate) or a copolymer of methyl methacrylate with a vinyl monomer (e.g. acrylonitrile, N-allylmaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

E. Polyurethanes

The thermoplastic polyurethanes which may be used herein are described in, for example, U.S. Pat. No. 3,214,411. Particularly useful polyester resins used as starting materials for the thermoplastic polyurethanes are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed such that the final water content is from about 0.01 to about 0.2%.

Any suitable glycol may be used in the reaction with the adipic acid such as, ethylene glycol, propylene glycol, butylene glycol, hexanediol, bis-(hydroxymethyl-cyclohexane), 1,4-butanediol, diethylene glycol, 2,2-dimethylpropylene glycol, 1,3-propylene glycol, and the like. In addition to the glycols, a small amount of trihydric alcohol of up to about 1% may be used, such as trimethylolpropane, glycerol, hexanetriol, and the like. The resulting hydroxyl polyester has a molecular weight of at least about 600, a hydroxyl number of from about 25 to about 190, and preferably between about 40 to about 60, and acid number of between about 0.5 and about 2 and a water content of 0.01 to about 0.2%.

The diisocyanates which may be used in preparing the polyurethanes include ehtylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2'-diphenylmethane diisocyanate, 2,2-diphenylpropane-4,4'diisocyanate, p-phenylene diisocyanate, m-phenylene diisocyanate, xylylene diisocyanate, 1,4-naphthylene diisocyanate, 1,5-naphthlyene diisocyanate, diphenyl-4,4'diisocyanate, azobenzene-4,4'-diisocyanate, diphenyl sulfone-4,4'-diisocyanate, dichlorohexamethylene diisocyanate, pentamethylene diisocyanate, 1-chlorobenzene-2,4-diisocyanate, furfurylidene diisocyanate, and the like.

Any suitable chain extending agent having active hydrogen containing groups reactive with isocyanate groups may be used, such as diols, including ethylene glycol, propylene glycol, 1,4-butanediol, butenediol, butynediol, xylylene glycols, amylene glycols, 1,4-phenylene-bis-hydroxy ethyl ether, 1,3-phenylene-bis-hydroxyethyl ether, bis-(hydroxy-methyl-cyclohexane), hexanediol, and the like; diamines, including ethylene diamine, cyclohexylene diamine, phenylene diamine, tolylene diamine, xylylene diamine, 3,3'-dichlorobenzidine, 3,3'-dinitrobenzidine and the like; alkanol amines such as ethanol amine, aminopropyl alcohol, 2,2-dimethyl propanol amine, 3-aminocyclohexyl alcohol, p-aminobenzyl alcohol, and the like.

If desired, a small amount of polyfunctional material may be utilized. This polyfunctional chain extender, however, should not be present in an amount greater than about 1% by weight. Any suitable polyfunctional compound may be used such as glycerol, trimethylolpropane, hexanetriol, pentaerythritol, and the like.

The polyester, the organic diisocyanate and the chain extender may be individually heated to a temperature of from about 60° to about 135° C. and then the polyester and chain extender are substantially simultaneously mixed with the diisocyanate. To increase the rate of reaction, any suitable catalyst may be used, such as tertiary amines and the like. Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like. Polyesters base on α-caprolactone are also preferred.

A polyether may be used instead of the polyester in the preparation of the thermoplastic polyurethanes and preferably, polytetramethylene glycol having an average molecular weight between about 60 and about 2000. Other polyethers, such as polypropylene glycol, polyethylene glycol and the like may be used providing their molecular weight is about 600.

The thermoplastic polyurethanes are described in, for example, U.S. Pat. Nos. 2,621,166, 2,729,618, 3,214,411, 2,778,810 and 3,012,992.

F. Vinyl Chloride Polymers

The vinyl chloride polymers suitable for use herein are polyvinyl chloride and copolymers of vinyl chloride with olefinically unsaturated polymerizable compounds which contain at least 80 percent by weight of vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and -alkyl-acrylate and their alkyl esters, amides and nitriles, methacrylic acid, maleic acid or anhydride, methyl methacrylate, ethyl acrylate, 2-ethyl-hexyl-acrylate, butyl methacrylate, 2-hydroxypropyl acrylate, acrylamide, N-methyl acrylamide, acrylonitrile and methacrylonitrile, aromatic vinyl compounds, such as styrene and vinyl naphthalene and olefinically unsaturated hydrocarbons such as ethylene, bicyclo-[2,2,1]-hept-2-ene and biocyco-[2,2,1]-hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weights of from about 40,000 to about 60,000 are preferred.

G. Poly(aryl ether)s

The poly)aryl ether) resin components suitable for use herein are linear, thermoplastic polyarylene polyether polysulfones, wherein the arylene units are interspersed with ether and ketone and/or sulfone linkages. These resins may be obtained by reaction of an alkali metal double salt of a dyhydric phenol ad a dihalobenzenoid compound, either or both of which contain a sulfone or ketone linkage, i.e., —SO—$_2$— or —CO— between arylene groupings, to provide sulfone or ketone units in he polymer chain in addition to arylene units and ether units. The polyarylene polyether has a basic structure comprising recurring units of the formula:

—O—E—O—E'— wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. Nos. 3,264,536, and 4,108,837, for example.

The residuum of dihydric phenol, E is derived from dinuclear phenols having the structure:

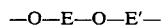
OH(Ar—R$_8$—Ar)OH wherein Ar is an aromatic group and preferably is a phenylene group, C and C$_1$ may be the same or different inert substituent groups, such as alkyl groups having from 1 to 4 carbon atoms, halogen atoms, i.e., fluorine, chlorine, bromine, iodine, or alkoxy radicals having from 1 to 4 carbon atoms, r and r$_1$ are integers having a value of from 0 to 4, inclusive, and R$_8$ is representative of a bond between aromatic carbon atoms as in dihydroxydiphenyl, or is a divalent radical, including, for example, CO, O, S, S—S, SO$_2$ or a divalent organic hydrocarbon radical, such as alkylene, alkylidene, cycloaklylene, cycloalkylidene, or the halogen, alkyl, aryl, substituted alkylene, alkylidene, cycloalkylene, and cyloalkylidene radicals as well as alkarylene and aromatic radicals and a ring fused in both Ar groups.

Typical preferred polymers having recurring units having the following structure:

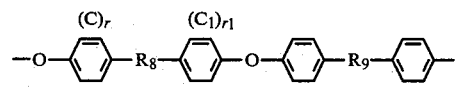

as described in U.S. Pat. No. 4,108,837, supra. In the foregoing formula C and C$_1$ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and r$_1$ are integers having a value of from 0 to 4, inclusive. Typically, R$_8$ is representative of a bond between aromatic carbon atoms or a divalent connecting radical and R$_9$ represents sulfone, carbonyl, or sulfoxide. Preferably, R$_8$ represents a bond between aromatic carbon atoms. Even more preferred are the thermoplastic polysulfones of the above formula wherein r and r$_1$ are zero, R$_8$ is a divalent connection radical of the formula:

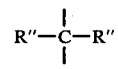

wherein R" is selected from lower alkyl, aryl, and the halogen substituted groups thereof, preferably methyl and R$_9$ is a sulfone group.

The poly(aryl ether)s have a reduced viscosity of from about 0.4 to about 1.5 dl/g as measured in an appropriate solvent at an appropriate temperature depending on the particular polyether, such as in methylene chloride at 25° C.

The preferred poly(aryl ether)s have repeating units of the formula:

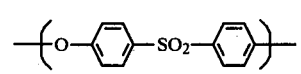

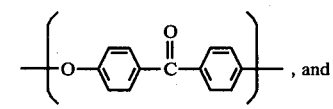, and

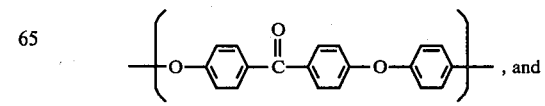, and

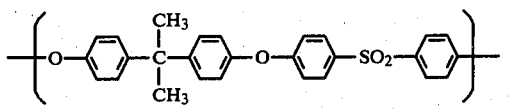

H. Copolyetherester Block Copolymer

The copolyetheresters suitable for use herein are well known in the art and are described in, for example, U.S. Pat. Nos. 3,784,520 and 3,766,146.

The polyester comprises a multiplicity of recurring intralinear long chain and short chain ester units connected head-to tail through ester linkages, said long chain ester units being represented by the following structure:

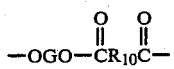 (a)

and said short chain ester units being represented by the following structure:

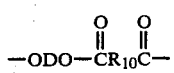 (b)

wherein G is a divalent radical remaining after removal of terminal hydroxy groups from a poly(alkylene oxide) glycol having a molecular weight of from about 400 to about 3500; D is a divalent radical remaining after removal of hydroxyl groups from a low molecular weight diol having a molecular weight of less than about 250; and $R_{10}$ is a divalent radical remaining after removal of carboxyl groups from a dicarboxylic acid having a molecular weight of less than about 300, with the proviso that the short chain ester units constitute from about 25 to about 65% by weight of the copolyester, at least about 70% of the $R_{10}$ groups are 1,4-phenylene radicals, at least about 70% of the D groups are 1,4-butylene radicals, and the sum of the percentages of the $R_{10}$ groups which are not 1,4-phenylene radicals and of the D groups which are not 1,4-butylene radicals do not exceed about 30%.

The term "long chain ester units" as applied to units in a polymer chain refers to the reaction product of a long chain glycol with a dicarboxylic acid. Such "long chain ester units", which are a repeating unit in the copolyesters herein correspond to the Formula (a) above. The long chain glycols may be poly(alkylene oxide) glycols having a molecular weight between about 400 and about 3500, preferably between about 600 and about 2000. Copolyesters prepared from poly)alkylene oxide glycols having a molecular weight between about 600 to about 2000 are preferred.

The term "short chain ester units" as applied to units in a polymer chain refers to low molecular weight compounds or polymer chain units having molecular weight of less than about 550. They are made by reacting a low molecular weight diol (below about 250) with a dicarboxylic acid to form ester units represented by Formula (b) above.

Included among the low molecular weight diols (other than 1,4-butanediol which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used are bis(p-hydroxy) diphenyl, bis(p-hydroxyphenyl)methane, and bis(p-hydroxyphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebecic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid and 4,4-bicyclohexyl dicarboxylic acid. Preferred cycloaliphatic acids are cyclohexane dicarboxylic acids.

Representative aromatic dicarboxylic acids which may be used are phthalic, terephthalic and isophthalic acids, substituted dicarboxy compounds with two benzene nuclei, such as bis(p-carboxyphenyl) methane and p-carboxyphenyloxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weigh diol incorporated into the polymer is 1,4-butanediol. Thus, at least 70% of the $R_{10}$ groups in Formulae (a) and (b) above are 1,4-phenylene radicals and at least about 70% of the D groups in Formula b above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

I. Polyhydroxyethers

The thermoplastic polyhydroxyethers which may be used herein have the following general formula:

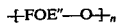

where F is the radical residuum of a dihydric phenol, E" is a radical residuum of an epoxide selected from mono- and diepoxides and which contain from 1 to 2 hydroxyl groups, and n is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

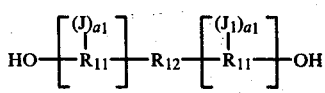

wherein $R_{11}$ is an aromatic divalent hydrocarbon radical, such as naphthylene and phenylene with phenylene being preferred, J and $J_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, a and $a_1$ are independently integers of 0 to 4, $R_{12}$ is independently selected from a divalent saturated aliphatic hydrocarbon radical particularly alkylene or alkylidene radicals having from 1 to 8 carbon atoms, especially $C(CH_3)_2$, cycloalkylene, cycloalkylidene or any other divalent group such as O, S, SO, $SO_2$, CO, a chemical bond, etc. Particularly preferred are dihydric polynuclear phenols having the general formula:

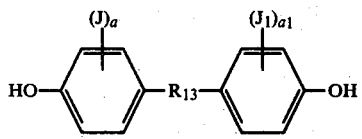

wherein J, $J_1$, a and $a_1$ are as previously defined, and $R_{13}$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula:

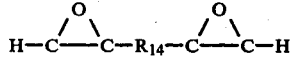

wherein $R_{14}$ is representative of a bond between adjacent carbon atoms or a divalent organic radical such as an aliphatic, aromatic, alicyclic, heterocyclic or acyclic arrangement of atoms.

Other diepoxides which can be mentioned include those wherein two oxirane groups are linked through an aromatic ether, i.e., compounds having the grouping:

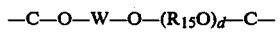

wherein $R_{15}$ is a divalent organic radical, W is a divalent aromatic radical residuum of a dihydric phenol, such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,924,747; and 2,777,051.

The polyarylates produced by the process of this invention have a reduced viscosity of from about 0.1 to greater than 1.0 dl/gm, preferably from about 0.2 to about 1.0 dl/gm as measured in chloroform or other solvents known in the art, such as para-chlorophenol, phenol/tetrachloroethane (60:40), and the like. Reduced viscosities of the polyarylates measured in these solvents generally have the same range as those measured in chloroform.

The polyarylates may be prepared in the presence of materials such as molecular weight regulators, antioxidants, and the like.

The polyarylates obtained by the process of this invention may be used together with the well-known additives such as plasticizers, pigments, lubricating agents, mold release agents, stabilizers, inorganic fillers, and the like. These polyarylates may also further be blended with one or more thermoplastic polymers such as polyesters, polycarbonates, styrene polymers, alkyl acrylate polymers, polyurethanes, poly(aryl ether) polymers, polyamides, polyhydroxy ether polymers, copolyetherester block copolymers, polyamides, and the like.

EXAMPLES

The following examples serve to give specific illustrations of the practice of this invention but they are not intended in any way to limit the scope of this invention.

EXAMPLE 1

A three neck, 250 ml round bottom flask was equipped with a mechanical stirrer, a nitrogen inlet and a vacuum jacketed vigreux column and distillation head. The flask was charged with 8.30 g (0.050 moles) of isophthalic acid, 8.30 g (0.050 moles) of terephthalic acid, 31.26 g (0.1005 moles) of bisphenol-A diacetate, 7.16 g of poly(ethylene terephthalate) and 10.8 g of diphenyl ether. The system was purged with nitrogen for 1 hour at ambient temperature (about 25° C.). While maintaining a constant nitrogen sparge the reaction mixture was heated to between 260° and 270° C. Acetic acid begain to distill at this point. After one hour, the temperature was increased to between 290° and 300° C. A partial vacuum (150 mm of Hg) was applied to the reaction after 2 hours at this temperature. The vacuum was reduced to 1 mm of mercury in a stepwise fashion (50 mm/30 min.). After an additional one hour at 290°-300° C. and a full vacuum (1 mm of mercury) the system was allowed to cool to ambient temperature (about 25° C.). The resulting polyarylate was ground and then dried under vacuum at a temperature of 120° to 130° C. for 24 hours.

The reduced viscosity of this polymer was measured in chloroform (0.50 gm/100 ml) at 25° C. and found to be 0.45 dl/g.

EXAMPLES 2 TO 7

The procedure outlined in Example 1 was exactly repeated except that the poly(ethylene terephthalate) was replaced by a variety of other polymers. The results of are summarized in the Table.

TABLE

| Example | Polymer | Reduced Viscosity |
|---|---|---|
| 2 | Polycarbonate | 0.22 |
| 3 | Poly(ethylene ethyl acrylate) | 0.54 |
| 4 | Poly(tetramethylene | 0.47 |

TABLE-continued

| Example | Polymer | Reduced Viscosity |
|---|---|---|
| | terephthalate) | |
| 5 | Polyarylether sulfone | 0.32 |
| 6 | Poly(hexamethylene adipamide) | 0.22 |
| 7 | Poly(amide) | 0.31 |

We claim:

1. An improved process for preparing a polyarylate having a reduced viscosity of from about 0.1 to greater than 1.0 dl/g which process comprises the following steps:
   (a) reacting an acid anhydride derived from an acid containing from 2 to 8 carbon atoms with at least one dihydric phenol to form the corresponding diester; and
   (b) reacting said diester with at least one aromatic dicarboxylic acid at a temperature sufficient to form the polyarylate, wherein the improvement comprises carrying out said process in the presence of at least one thermoplastic polymer.

2. A process as defined in claim 1, wherein the acid anhydride is acetic anhydride.

3. A process as defined in claim 1, wherein the dihydric phenol is of the following formula:

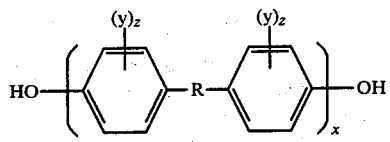

wherein the y's are independently selected from alkyl groups of 1 to 4 carbon atoms, chlorine or bromine, z independently has a value of from 0 to 4, inclusive, R is independently selected from a divalent saturated hydrocarbon alleylene or alleylidene radical having 1 to 8 atoms, a cycloalkylene or cycloalkylidene radical having up to and including 9 carbon atoms, O, S, SO, SO$_2$, CO, x is 0 or 1.

4. A process as defined in claims 1, 2, or 3 wherein the dihydric phenol is bisphenol-A.

5. A process as defined in claim 1, wherein the aromatic dicarboxylic acid is selected from isophthalic acid, terephthalic acid, or mixtures thereof.

6. A process as defined in claim 5 wherein the isophthalic acid to terephthalic acid ratio in the mixture of acids is about 20:80 to about 100:0.

7. A process as defined in claim 6, wherein the ratio is about 25:75 to about 75:25.

8. A process as defined in claim 1, wherein an aliphatic diacid containing from 2 to about 10 carbon atoms is added to step (b).

9. A process as defined in claim 8, wherein the diacid is selected from adipic acid or sebacic acid, or mixtures thereof.

10. A process as defined in claim 1, wherein the diester is reacted with at least one aromatic dicarboxylic acid in the presence of an oganic solvent.

11. A process as defined in claim 1, wherein the solvent is selected from a diphenyl ether compound, a cycloaliphatic compound or a substituted aromatic or heteroaromatic compound, or a halogenated and/or etherated substituted aromatic or heteroaromatic compound, or mixtures thereof.

12. A process as defined in claim 10, wherein the solvent is diphenyl ether.

13. A process as defined in claim 1 wherein the temperature is from about 260° to about 350° C.

14. A process as defined in claim 1 wherein the thermoplastic polymer is selected from the group consisting of a polyester, an aromatic polycarbonate, a styrene polymer, a (polyalkyl acrylate) polymer, a polyurethane, a vinyl chloride polymer, a poly(aryl ether), a copolyetherester block copolymer, a polyhydroxyether, and mixtures thereof.

15. A process as defined in claim 14 wherein the thermoplastic polymer is a polyester.

16. A process as defined in claim 15 wherein the polyester has repeating units of the general formula:

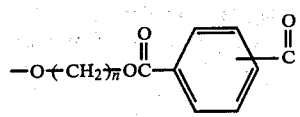

wherein n is an integer of from 2 to 4.

17. A process as defined in claim 16 wherein the polyester is poly(ethylene terephthalate).

18. A process as defined in claim 15 wherein the polyester has recurring units of the following formula:

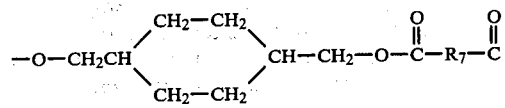

wherein the cyclohexane ring is selected from cis- and trans- isomers thereof and R$_7$ represents an aryl radical containing 6 to 20 carbon atoms and which is the decarboxylated residue derived from an aromatic dicarboxylic acid.

19. A process as defined in claim 18 wherein the polyester has recurring units of the following formula:

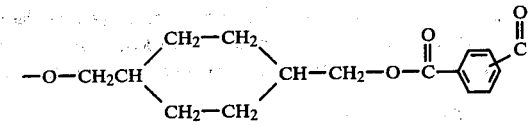

20. A composition as defined in claim 15 wherein the polyester has recurring units of the following formula:

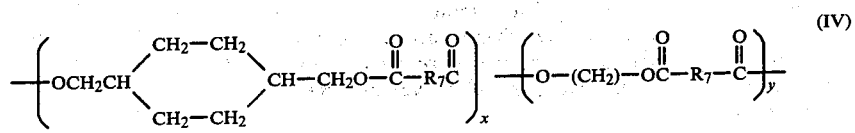

(IV)

wherein the cyclohexane ring is selected from the cis- and trans- isomers thereof, R is as previously defined, n is an integer of 2 to 4, the x units comprise from about thereof.

10 to about 90 percent by weight and the y units comprise about 90 to about 10 percent by weight.

21. A process as defined in claim 20 wherein the polyester has repeating units of the following formula:

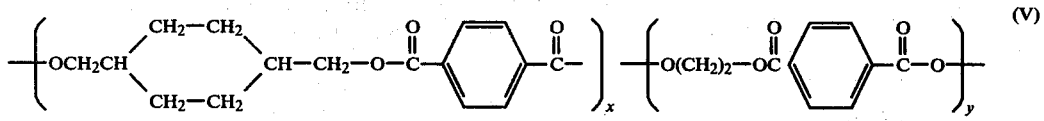

22. A process as defined in claim 14 wherein the thermoplastic polymer is an aromatic polycarbonate.

23. A process as defined in claim 22 wherein the aromatic polycarbonate is the reaction product of a dihydric phenol and a carbonate precursor.

24. A process as defined in claim 23 wherein the dihydric phenol is bisphenol-A and the carbonate precursor is carbonyl chloride.

25. A process as defined in claim 14 wherein the thermoplastic polymer is a styrene polymer.

26. A process as defined in claim 25 wherein the styrene polymer is prepared by polymerizing a conjugated diene monomer or a conjugated diene monomer and monomer copolymerizable therewith or an acrylic acid ester to provide an elastomeric backbone and thereafter grafting at least one grafting monomer onto said backbone.

27. A process as defined in claim 26 wherein the conjugated diene monomer is butadiene and the grafting monomer is selected from styrene, an acrylonitrile, an acrylic acid ester, or mixtures thereof.

28. A process as defined in claim 27 wherein the styrene resin is a butadiene/styrene/acrylonitrile resin.

29. A process as defined in claim 14 wherein the thermoplastic polymer is a poly(alkyl acrylate) polymer.

30. A process as defined in claim 29 wherein the poly(alkyl acrylate) is poly(methyl methacrylate).

31. A process as defined in claim 29 wherein the poly(alkyl acrylate) is a copolymer of methyl methacrylate and a vinyl monomer wherein the amount of methyl methacrylate is greater than about 70 percent of weight of the copolymer.

32. A process as defined in claim 31 wherein the vinyl monomer is selected from acrylonitrile, N-allylmaleimide, vinyl chloride, N-vinylmaleimide or an alkyl acrylate or methacrylate, wherein the alkyl group contains from 1 to 8 carbon atoms.

33. A process as defined in claim 29 wherein the poly(alkyl acrylate) is an alkyl acrylate grafted onto an unsaturated elastomeric backbone, wherein the alkyl acrylate comprises greater than about 50 weight percent of the graft copolymer formed.

34. A process as defined in claim 14 wherein the thermoplastic polymer is a polyurethane.

35. A process as defined in claim 34 wherein the polyurethane is derived from a polyester resin having a molecular weight of at least about 600, an organic diisocyanate, and a low molecular weight chain extender having active hydrogen containing groups which are reactive with the diisocyanate.

36. A process as defined in claim 34 wherein the polyurethane is derived from a polyether, an organic diisocyanate, and a low molecular weight chain extender having active hydrogen containing groups which are reactive with the diisocyanate.

37. A process as defined in claim 36 wherein the polyether is selected from polytetramethylene glycol having an average molecular weight between about 600 to 2000, polypropylene glycol, and polyethylene glycol having a molecular weight above about 600.

38. A process as defined in claim 14 wherein the thermoplastic polymer is a poly(vinyl chloride) polymer.

39. A process as defined in claim 38 wherein the poly(vinyl chloride) polymer is a copolymer of vinyl chloride with an olefinically unsaturated polymerizable compound which contains at least about 80 percent by weight of vinyl chloride incorporated therein.

40. A process as defined in claim 14 wherein the thermoplastic polymer is poly(aryl ether).

41. A process as defined in claim 40 wherein the poly(aryl ether) comprises recurring units of the formula:

$$-O-E-O-E'$$

wherein E is the residuum of a dihydric phenol and E' is the residuum of a benzenoid compound having an inert electron withdrawing group.

42. A process as defined in claim 41 wherein the poly(aryl ether) has recurring units having the formula:

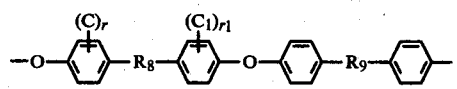

C and $C_1$ can be the same or different inert substituent groups and are selected from alkyl groups having from 1 to 4 carbon atoms, fluorine, chlorine, bromine, iodine, or alkoxy radicals having from 1 to 4 carbon atoms, $R_8$ represents a bond between aromatic carbon atoms or a divalent connecting radical, $R_9$ is sulfone, carbonyl or sulfoxide, r and $r_1$ are integers having a value of from 0 to 4, inclusive.

43. A process as defined in claim 42 wherein r and $r_1$ are O, $R_9$ is $SO_2$, and $R_{18}$ is the following:

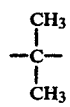

44. A process is defined in claim 14 wherein the thermoplastic polymer is a copolyetherester block copolymer.

45. A process is defined in claim 44 wherein the copolyetherester block copolymer has a multiplicity of recurring intralinear long chain and short chain ester units connected head-to-tail through ester linkages, said long chain ester units being represented by the following structure:

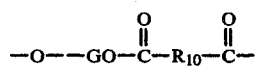

and said short chain ester units being respresented by the following structure

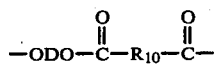

wherein G is a divalent radical remaining after removal of terminal hydroxyl groups from a poly(alkylene oxide) glycol having a molecular weight of from about 400 to about 3500, $R_{10}$ is a divalent radical remaining after removal of carboxyl groups from a dicarboxylic acid; with the provisos that the short chain ester units constitute from about 25 to 65% by weight of the copolyester, at least about 70% of the $R_{10}$ groups are 1,4-phenylene radicals, at least about 70% of the D groups are 1,4-butylene radicals, and the sum of the percentages of the $R_{10}$ groups which are not 1,3-phenylene radicals and of the D groups which are not 1,4-butylene radicals does not exceed about 30%.

46. A process as defined in claim 14 wherein the thermoplastic polymer is a polyhydroxyether.

47. A process as defined in claim 46 wherein the polyhydroxyether has the general formula

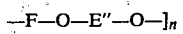

wherein F is the radical residuum of a dihydric phenol, E" is a radical residuum of an epoxide selected from mono- and diepoxides containing from 1 to 2 hydroxyl groups and n is an integer which represents the degree of polymerization and is at least about 30.

48. A polymer produced by the process of claims 1 or 14.

* * * * *